(12) United States Patent
Nikawa et al.

(10) Patent No.: US 6,291,913 B1
(45) Date of Patent: Sep. 18, 2001

(54) AUTOMOTIVE ALTERNATOR

(75) Inventors: Youji Nikawa; Katsumi Adachi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/479,907

(22) Filed: Jan. 10, 2000

(30) Foreign Application Priority Data

Jun. 29, 1999 (JP) .................................................. 11-183554

(51) Int. Cl.$^7$ ........................................................ H02K 11/00
(52) U.S. Cl. ........................................ 310/68 R; 310/71
(58) Field of Search ................................ 310/68 R, 68 D, 310/58, 71, 89, 239; 363/145

(56) References Cited

U.S. PATENT DOCUMENTS

| 3,496,394 | * | 2/1970 | Balcke et al. ...................... 310/68 D |
| 4,284,914 | * | 8/1981 | Hagenlocher et al. ............ 310/68 D |
| 4,284,915 | * | 8/1981 | Hagenlocher et al. ............ 310/68 D |
| 4,504,752 | * | 3/1985 | Iwaki et al. ........................ 310/68 R |
| 4,957,876 | * | 9/1990 | Shibata et al. ......................... 29/827 |
| 5,231,321 | * | 7/1993 | Takiguchi .............................. 310/51 |
| 5,248,910 | * | 9/1993 | Yockey et al. ..................... 310/68 R |
| 5,451,823 | * | 9/1995 | Deverall et al. ................... 310/68 D |
| 5,550,415 |   | 8/1996 | Adachi et al. ..................... 310/68 R |
| 5,677,616 | * | 10/1997 | Ooiwa ................................... 322/17 |
| 5,686,780 | * | 11/1997 | Adachi et al. ..................... 310/68 D |
| 6,081,054 | * | 6/2000 | Kashihara et al. ................. 310/68 D |

FOREIGN PATENT DOCUMENTS

| 2486323 | * | 1/1982 | (FR) . |
| 2044552A | * | 10/1980 | (GB) . |
| 2 091 007 |  | 7/1982 | (GB) . |
| 3-128640 |  | 5/1991 | (JP) . |
| 5-219704 |  | 8/1993 | (JP) . |
| 7-213034 |  | 8/1995 | (JP) ............................. H02K/19/36 |

* cited by examiner

Primary Examiner—Joseph Waks
(74) Attorney, Agent, or Firm—Sughrue, Mion, Zinn, Macpeak & Seas, PLLC (57) ABSTRACT

In an automotive alternator, a surge absorber housed in a housing portion of a base includes a capacitor element whose positive terminal and negative terminal are electrically joined to terminals of an inserted conductor, and a resin portion covering the whole of the capacitor element including the positive terminal and the negative terminal.

9 Claims, 13 Drawing Sheets

AUTOMOTIVE ALTERNATOR

BACKGROUND OF THE INVENTION

1. Field of the Invention

The present invention relates to an automotive alternator provided with a surge absorber for absorbing surges arising in a voltage regulator for adjusting the magnitude of an alternating voltage generated in a stator.

2. Description of the Related Art

Figure 8:
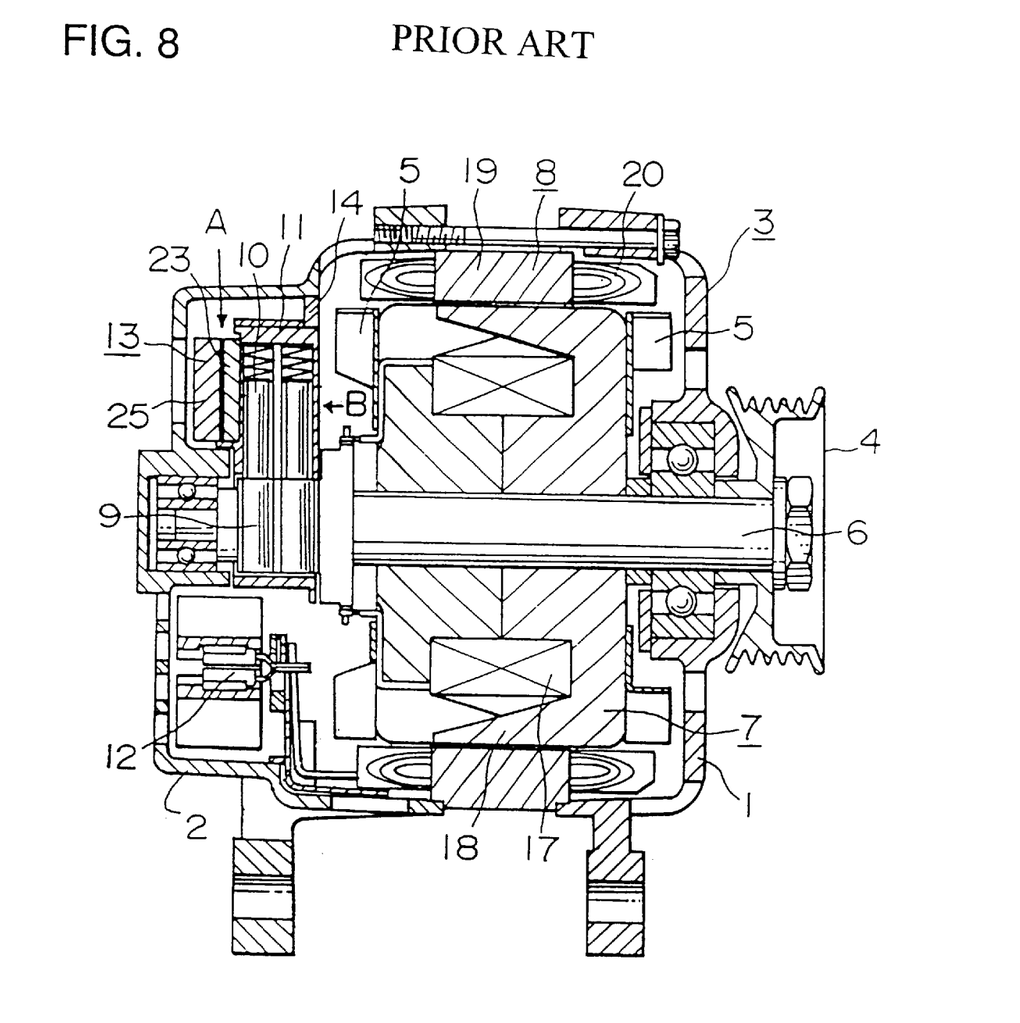
FIG. 8 is a cross section of a conventional automotive alternator.
Figure 9:
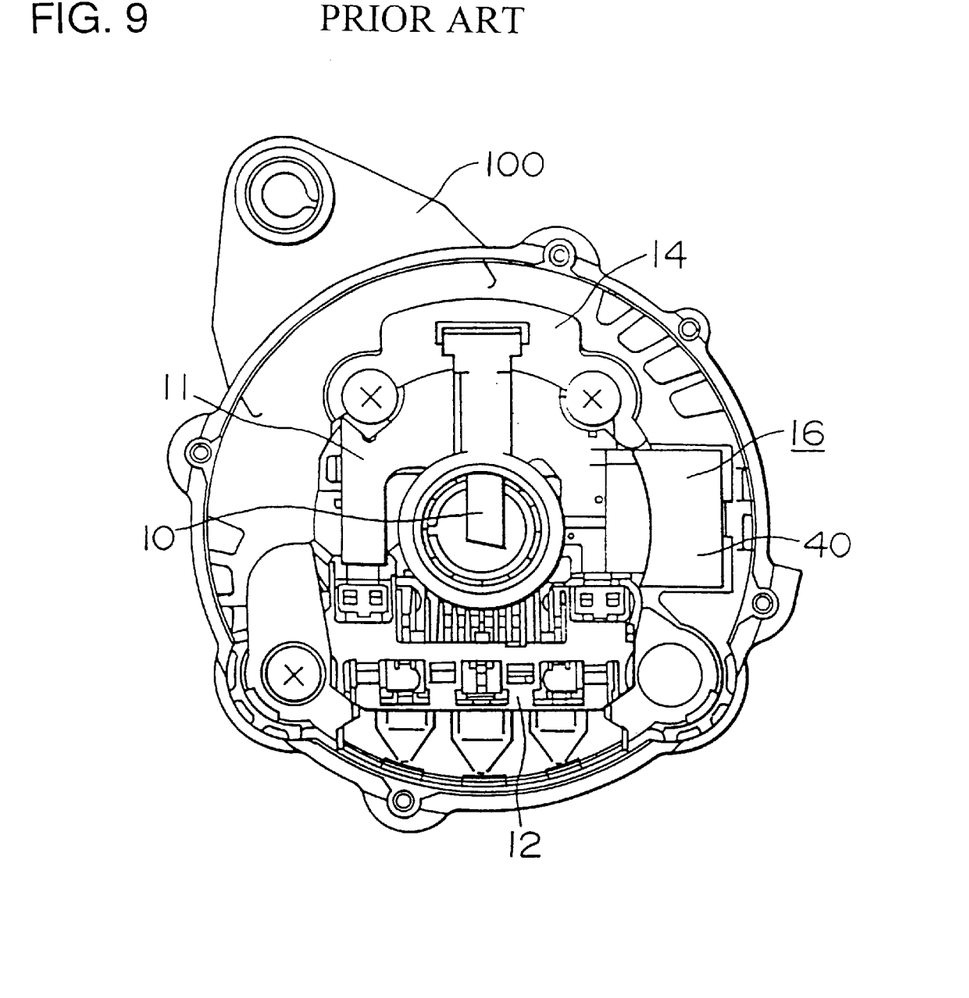
FIG. 9 is a front elevation of the interior of the automotive alternator in FIG. 8.
Figure 10:
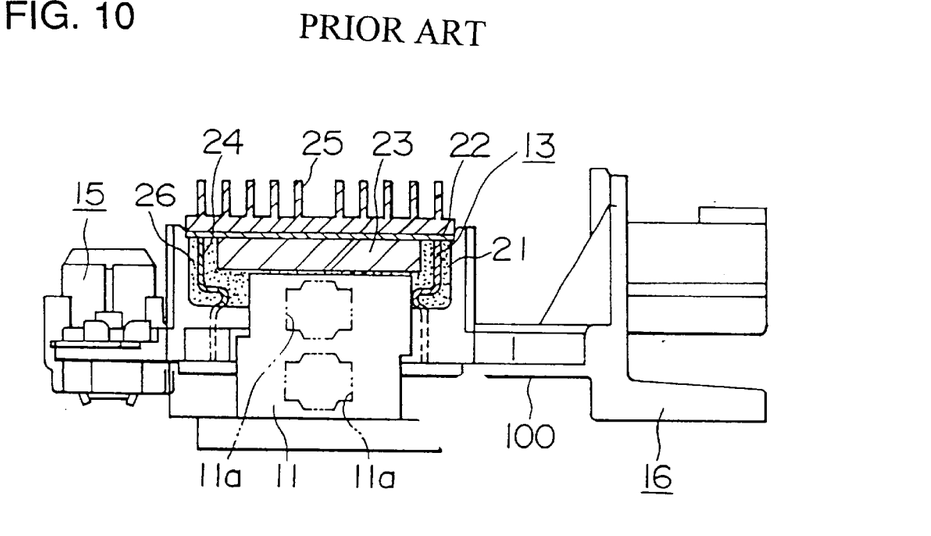
FIG. 10 is a view of the interior of the automotive alternator in FIG. 8 from the direction of arrow A.
Figure 11:
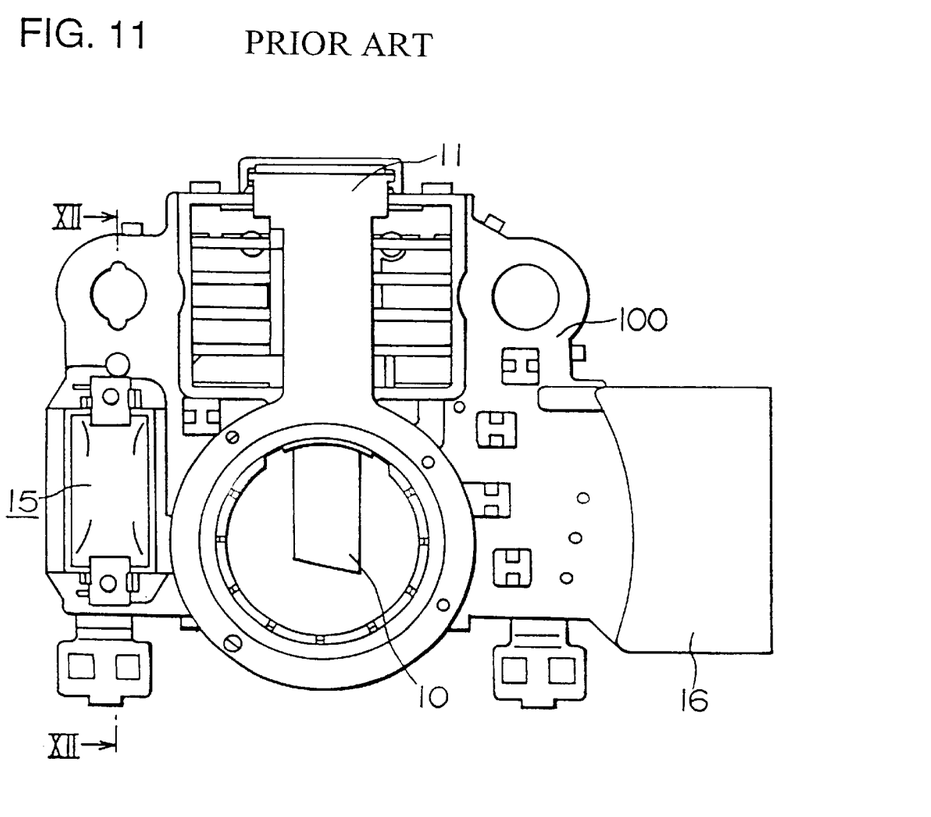
FIG. 11 is a view of the interior of the automotive alternator in FIG. 8 from the direction of arrow B.
Figure 12:
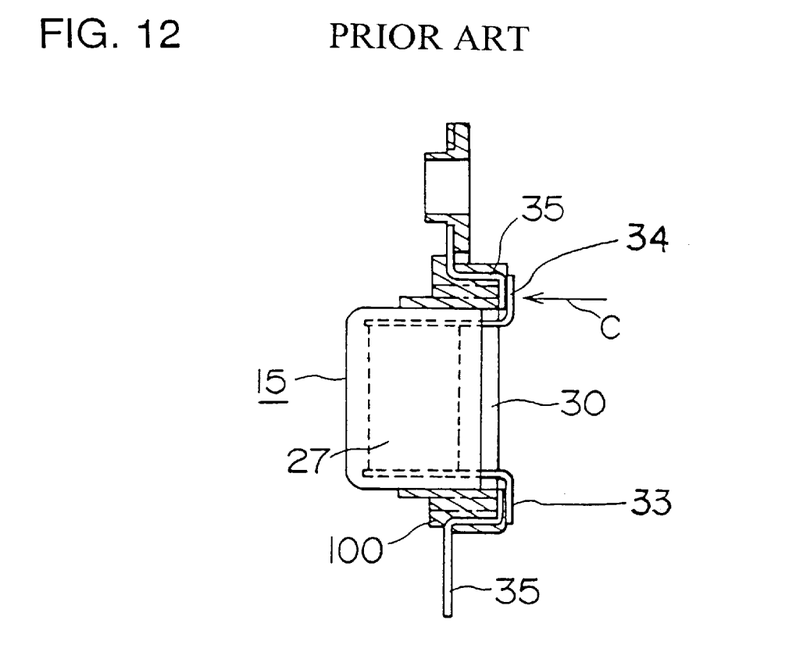
FIG. 12 is a cross section taken along line XII—XII in FIG. 11.
Figure 13:
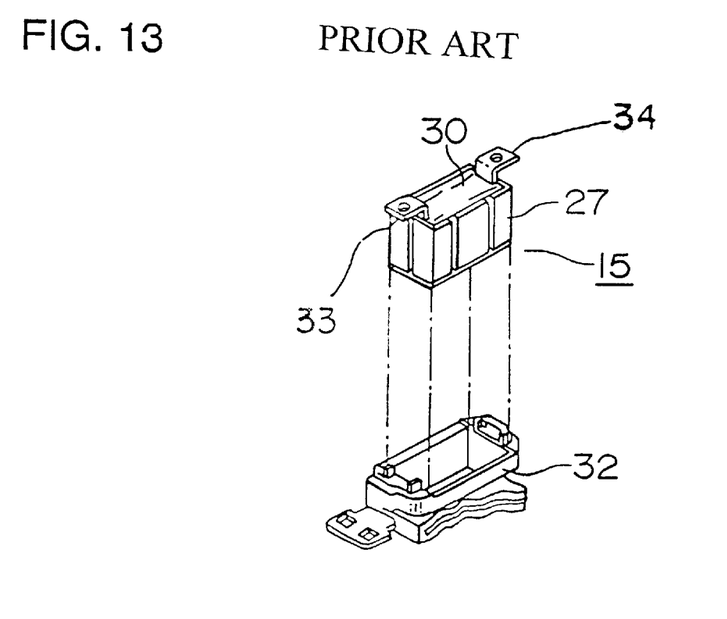
FIG. 13 is an exploded perspective of the surge absorber in FIG. 12.

FIG. 8 is a cross section of a conventional automotive alternator (hereinafter "alternator"); FIG. 9 is a front elevation of the interior of the alternator in FIG. 8, FIG. 10 is a view of the interior of the alternator in FIG. 8 from the direction of arrow A (Note: regulator is sectioned), FIG. 11 is a view a view of the interior of the alternator in FIG. 8 from the direction of arrow B, FIG. 12 is a cross section taken along line XII—XII in FIG. 11 (Note: surge absorber is not sectioned), and FIG. 13 is an exploded perspective of the surge absorber in FIG. 12.

This alternator includes: a case 3 consisting of an aluminum front bracket 1 and an aluminum rear bracket 2; a shaft 6 disposed in the case 3 to one end of which a pulley 4 is secured; a Lundell-type rotor 7 secured to the shaft 6; fans 5 secured to both end surfaces of the rotor 7; a stator 8 secured to the inner wall of the case 3; and slip rings 9 secured to the other end of the shaft 6 for supplying electric current to the rotor 7.

This alternator also includes: a base 100 having an inserted conductor embedded therein by insertion molding with PPS resin; a brush holder 11 integrated with the base 100 accommodating in a housing recess 11a a pair of brushes 10 moving in contact with the slip rings 9; a rectifier 12 electrically connected to the stator 8 for converting alternating current generated in the stator 8 into direct current; a voltage regulator 13 fitted into the brush holder 11 for adjusting the magnitude of the alternating current generated in the stator 8; an arc-shaped flow control plate 14 disposed opposite the fans 5 for directing air drawn into the case 3 by the rotation of the fans 5 to the voltage regulator 13; a surge absorber 15 integrated with the base 100 for absorbing surges generated as the voltage regulator 13 regulates the voltage; and a connector 16 integrated with the base 100.

The rotor 7 includes: a rotor coil 17 for generating magnetic flux when electric current passes therethrough; and a pole core 18 disposed so as to cover the rotor coil 17 in which magnetic poles are produced by the magnetic flux generated by the rotor coil 17.

The stator 8 includes: a stator core 19; and a stator coil 20 composed of wire wound onto the stator core 19 in which alternating current is generated by changes in the magnetic flux from the rotor coil 17 as the rotor 7 rotates.

The voltage regulator 13 is housed in a recessed housing portion 21 formed in the brush holder 11. The voltage regulator 13 includes: a circuit board 22; a voltage regulator circuit portion 23 having IC chips, etc., mounted on the circuit board 22; lead pins 24 electrically connecting the voltage regulator circuit portion 23 to the inserted conductor in the base 100; cooling fins 25 secured to the circuit board 22; and a resin portion 26 sealing the voltage regulator circuit portion 23.

As shown in FIGS. 12 and 13, the surge absorber 15 includes: a case 27; and a capacitor element 30 having a rectangular parallelepiped shape over all disposed inside the case 27 for preventing the propagation of noise to the vehicle's electrical systems such as audio systems, blower fans, etc., by absorbing surges generated as the voltage regulator 13 regulates the voltage. This surge absorber 15 is inserted into a receiving portion 32 formed in the base 100. The positive terminal 33 and the negative terminal 34 of the capacitor element 30 are secured by soldering to the terminals 35 of the inserted conductor in the base 100.

Figure 14:
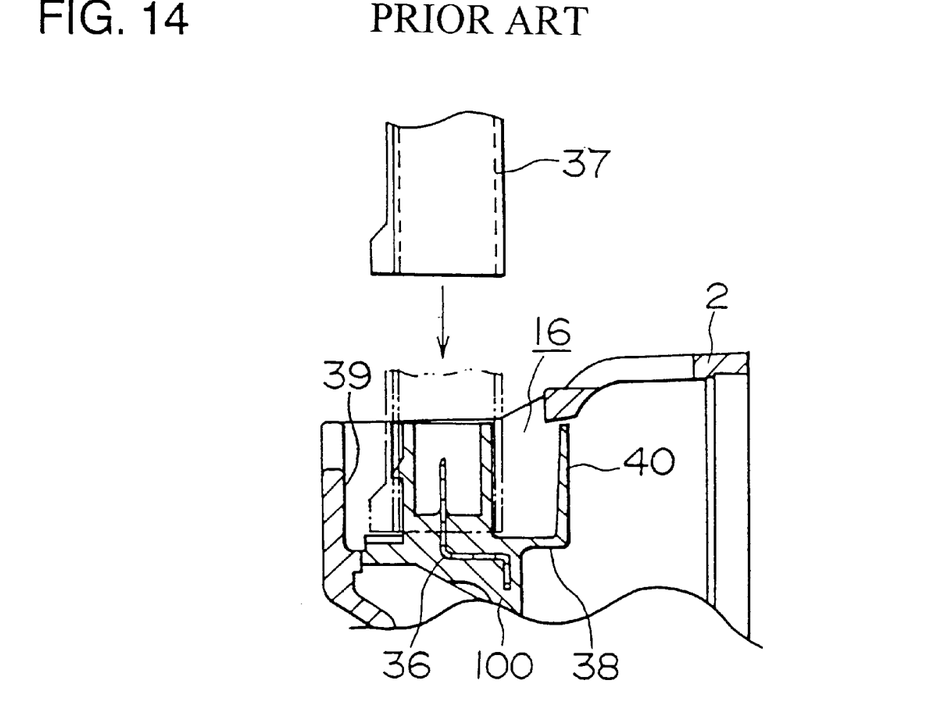
FIG. 14 is a partial cross section of the automotive alternator in FIG. 8.
Figure 15:
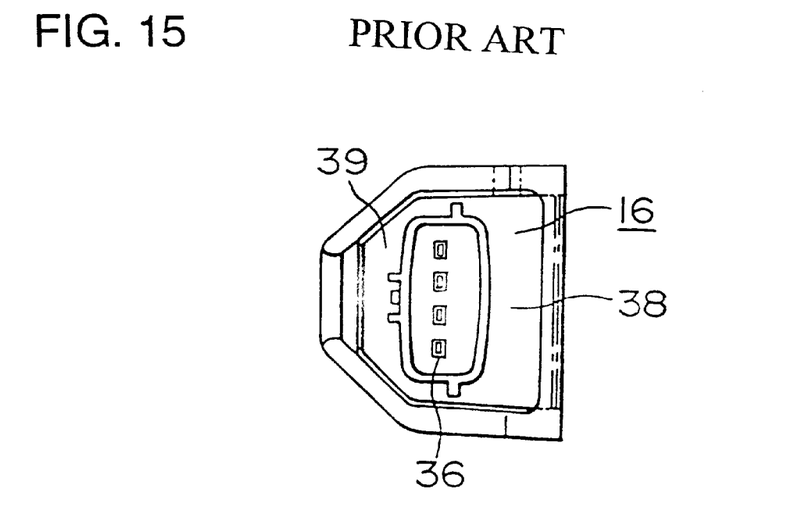
FIG. 15 is a front elevation of the connector in FIG. 14.

The connector 16 shown in FIGS. 14 and 15 includes terminal 36 for detecting battery voltage and terminal 36 for alerting the driver of the vehicle to overvoltage and inoperation of the alternator. These terminals 36 are constituted by the terminals of the inserted conductor. Because the connector 16 is constructed for the insertion of an external connector 37, the opening 39 thereof is formed with dimensions allowing clearance for the outside dimensions of the external connector 37. For that reason, a rear surface portion 38 for preventing air from being drawn through the opening 39 into the interior of the case 3 by the rotation of the fans 5 is formed on the rear side of the opening 39. A flat surface portion 40 is formed on the surface of the connector 16 opposite the fans 5. This flat surface portion 40 lies on the same plane as the flow control plate 14 which is disposed axially overlapping the base 100, and thus, air from the rotating fans 5 flows smoothly over the flat surface portion 40 and the flow control plate 14, reducing noise.

In an alternator of the above construction, a current is supplied by a battery (not shown) through the brushes 10 and slip rings 9 to the rotor coil 17, whereby magnetic flux is generated. At the same time, the pulley 4 is driven by the engine and the rotor 7 is rotated by the shaft 6, so that a rotating magnetic field is imparted to the stator coil 20 and electromotive force is generated in the stator coil 20. This alternating electromotive force passes through the rectifier 12 and is converted into direct current, the magnitude thereof is adjusted by the voltage regulator 13, and the battery is recharged.

In an alternator of the above construction, the surge absorber 15 for preventing the propagation of noise is secured to the base 100 by inserting it into a receiving portion 32 formed in the base 100 and soldering the positive terminal 33 and the negative terminal 34 of the capacitor element 30 to the terminals 35 of the inserted conductor. That is to say, because the surge absorber 15 is held by the terminals 33 and 34, the dynamic load acting on the surge absorber 15 due to vibrations from the engine, etc., is concentrated on the terminals 33 and 34, and one problem has been the risk of breakages at the terminals 33 and 34.

Because the terminals 33 and 34 are exposed to the exterior, other problem have been electrolytic corrosion of the metal positive terminal 33 due to wetting with salt water or the like, or breaking of the wires at the joints between the terminals 33 and 34 and the terminals 35 of the inserted conductor due to natural corrosion.

Because the joints between the terminals 35 of the inserted conductor and the terminals 33 and 34 of the capacitor element 30 are solder with the terminals 33 and 34 overlapping in surface contact with the terminals 35 in the axial direction, other problems have been that the soldering operation can only be performed from the direction of arrow C in FIG. 12, and that the joint strength has been unstable due to the irregular shape of the terminals 35, for example.

SUMMARY OF THE INVENTION

The present invention aims to solve the above problems and an object of the present invention is to provide an automotive alternator in which the terminals of the surge absorber and the terminals of the inserted conductor are joined reliably and firmly.

To this send, according to the present invention, there is provided an automotive alternator comprising: a case; a shaft rotatably disposed inside the case; a rotor secured to the shaft; a fan secured to an end surface of the rotor; a stator secured to an inner wall of the case; a base through which the shaft passes having an inserted conductor embedded therein except for terminals; a voltage regulator integrated with the base for adjusting the magnitude of an alternating voltage generated in the stator; a flow control plate disposed opposite the fan for directing to the voltage regulator air drawn into the case by the rotation of the fan; a surge absorber housed in a housing portion formed in the base for absorbing surges generated as the voltage regulator regulates the voltage; and a connector integrated with the base electrically connected to the inserted conductor, the surge absorber being provided with: a capacitor element whose positive terminal and negative terminal are electrically joined to the terminals of the inserted conductor; and a resin portion covering the whole of the capacitor element including the positive terminal and the negative terminal.

According to another aspect of the present invention, there is provided an automotive alternator comprising: a case; a shaft rotatably disposed inside the case; a rotor secured to the shaft; a fan secured to an end surface of the rotor; a stator secured to an inner wall of the case; a base through which the shaft passes having a first inserted conductor embedded therein; a voltage regulator integrated with the base for adjusting the magnitude of an alternating voltage generated in the stator; a flow control plate disposed opposite the fan for directing to the voltage regulator air drawn into the case by the rotation of the fan, the flow control plate having a second inserted conductor embedded therein except for terminals; a surge absorber housed in a housing portion formed in the flow control plate for absorbing surges generated as the voltage regulator regulates the voltage; and a connector integrated with the base electrically connected to the first inserted conductor, the surge absorber being provided with: a capacitor element whose positive terminal and negative terminal are electrically joined to the terminals of the second inserted conductor; and a resin portion covering the whole of the capacitor element including the positive terminal and the negative terminal.

DETAILED DESCRIPTION OF THE PREFERRED EMBODIMENTS

Embodiment 1

An automotive alternator (hereinafter simply "alternator") according to Embodiment 1 of the present invention will be explained below using the same numbering for parts which are the same as or correspond to those in FIGS. 8 to 11.

Figure 1:
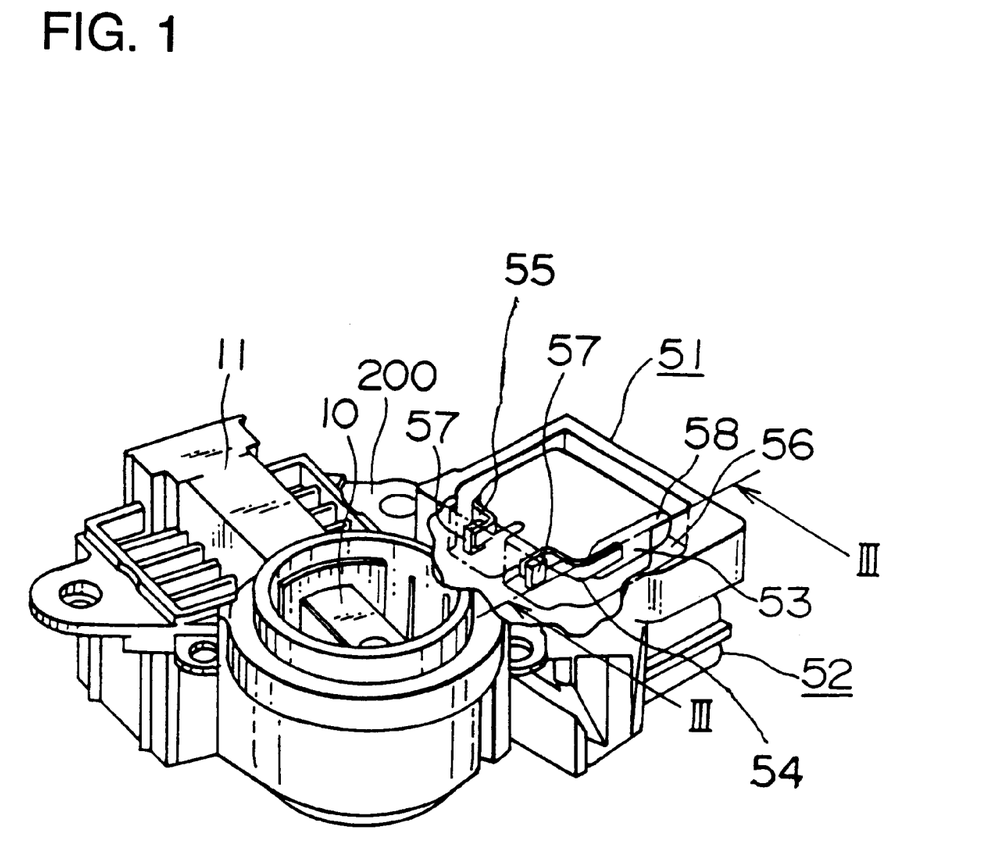
FIG. 1 is a perspective of part of an alternator according to Embodiment 1 of the present invention.
Figure 2A:
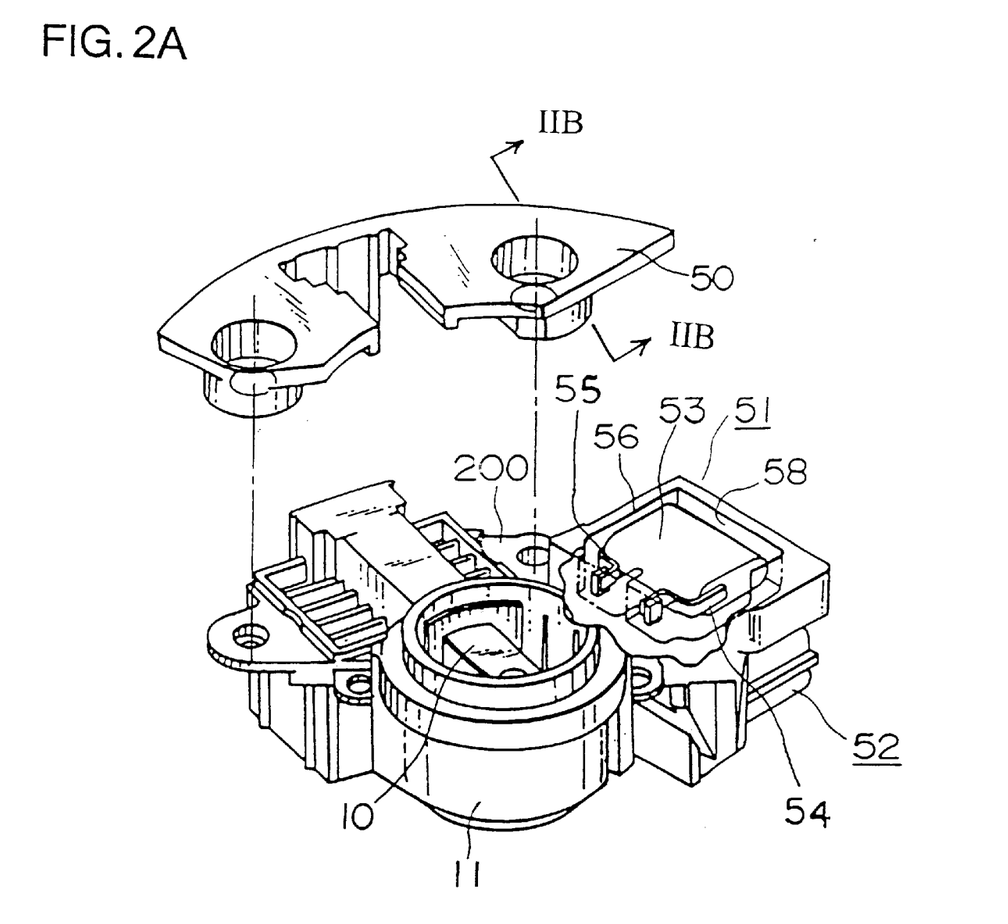
FIG. 2A is an exploded perspective of part of an alternator according to Embodiment 1 of the present invention.
Figure 2B:
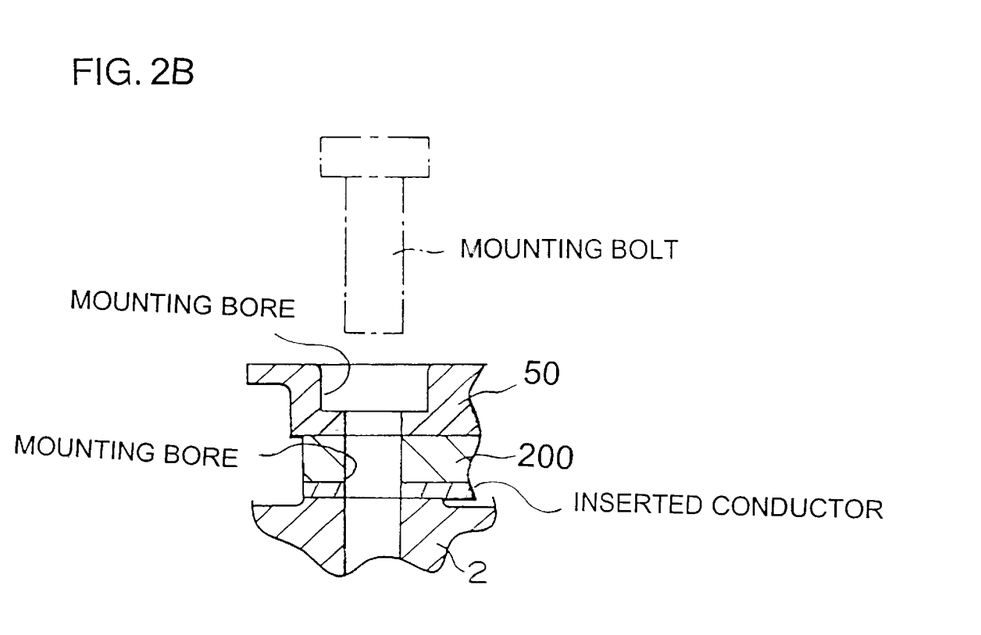
FIG. 2B is a cross section taken along line IIB, in FIG. 2A.
Figure 3:
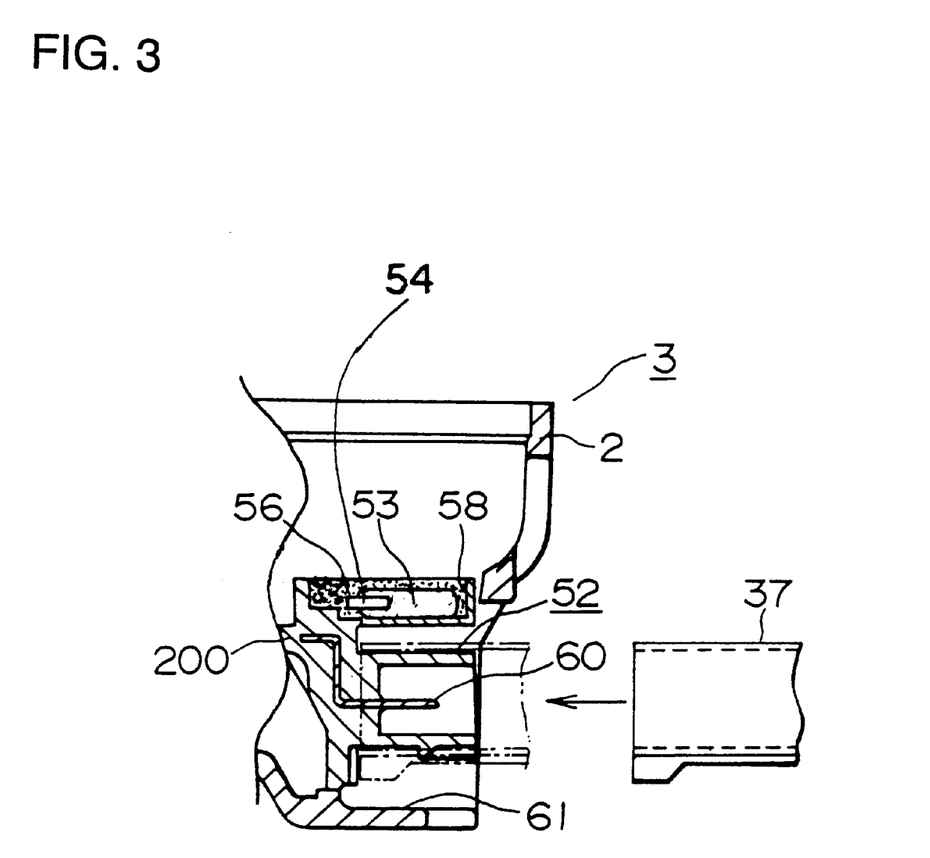
FIG. 3 is a partial cross section of an alternator according to Embodiment 1 of the present invention.

FIGS. 1 and 2 are perspectives of part of an alternator according to Embodiment 1 of the present invention, and FIG. 3 is a cross section taken along line III—III in FIG. 1 when the parts in FIG. 1 are housed in the rear bracket 2.

Figure 16:
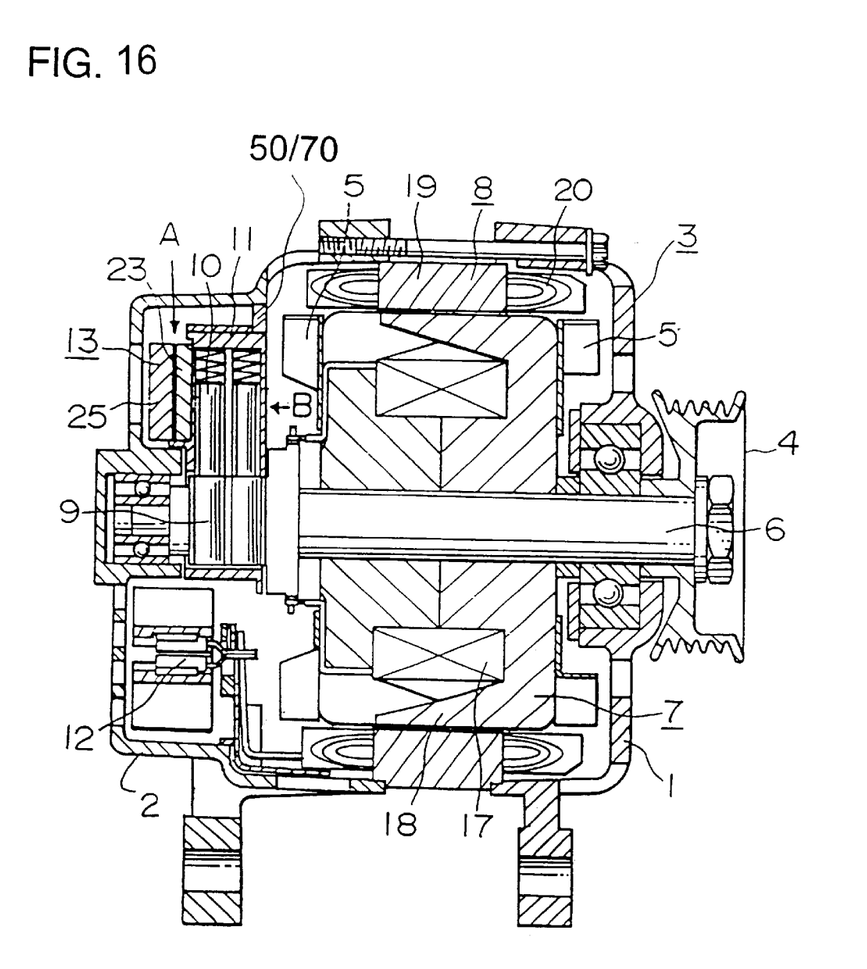
FIG. 16 is a cross section of an automotive alternator according to Embodiments 1 and 2 of the present invention.

This alternator includes: a case 3 consisting of an aluminum front bracket 1 and an aluminum rear bracket 2; a shaft 6 disposed in the case 3 to one end of which a pulley 4 is secured; a Lundell-type rotor 7 secured to the shaft 6; fans 5 secured to both end surfaces of the rotor 7; a stator 8 secured to the inner wall of the case 3; and slip rings 9 secured to the other end of the shaft 6 for supplying electric current to the rotor 7.

This alternator also includes: a base 200 having an inserted conductor embedded therein by insertion molding; a brush holder 11 integrated with the base 200 accommodating in a housing recess 11a a pair of brushes 10 moving in contact with the slip rings 9; a rectifier 12 electrically connected to the stator 8 for converting alternating current generated in the stator 8 into direct current; a voltage regulator 13 fitted into the brush holder 11 for adjusting the magnitude of the alternating current generated in the stator 8; an arc-shaped flow control plate 50 disposed opposite the fans 5 for directing air drawn into the case 3 by the rotation of the fans 5 to the voltage regulator 13; a surge absorber 51 for preventing the propagation of noise to the vehicle's electrical systems such as audio systems, blower fans, etc., by absorbing surges generated as the voltage regulator 13 regulates the voltage; and a connector 52 disposed in the vicinity of the surge absorber 51 on the opposite side from the fans 5 and integrated with the base 200.

The rotor 7 includes: a rotor coil 17 for generating magnetic flux when electric current passes therethrough; and a pole core 18 disposed so as to cover the rotor coil 17 in which magnetic poles are produced by the magnetic flux generated by the rotor coil 17.

The stator 8 includes: a stator core 19; and a stator coil 20 composed of wire wound onto the stator core 19 in which alternating current is generated by changes in the magnetic flux from the rotor coil 17 as the rotor 7 rotates.

The voltage regulator 13 is housed in a recessed housing portion 21 formed in the brush holder 11. The voltage regulator 13 includes: a circuit board 22; a voltage regulator circuit portion 23 having IC chips, etc., mounted on the circuit board 22; lead pins 24 electrically connecting the voltage regulator circuit portion 23 to the inserted conductor in the base 200; cooling fins 25 secured to the circuit board 22; and a resin portion 26 sealing the voltage regulator circuit portion 23.

The surge absorber 51 is housed in a recessed housing portion 58 formed in the base 200. This surge absorber 51 includes: a capacitor element 53 having a rectangular parallelepiped shape over all, a positive terminal 54 and a negative terminal 55 being exposed in a stepped shape from both ends thereof; and a resin portion 56 sealing the capacitor element 53 with epoxy resin. The terminals 54 and 55 of the capacitor element 53 are electrically joined by soldering to a pair of terminals 57 of the inserted conductor inside the housing portion 58 of the base 200.

The connector 52 includes terminals for detecting battery voltage and terminals 60 for alerting the driver of the vehicle to overvoltage and inoperation of the alternator. These terminals 60 are constituted by the terminals of the inserted conductor. Because the connector 52 is constructed for the insertion of an external connector 37, the opening 61 thereof is formed with dimensions allowing clearance for the outside dimensions of the external connector 37. For that reason, it is necessary to prevent air from being drawn through the opening 61 into the interior of the case 3 by the rotation of the fans 5, and the housing portion 58 of the base 200 performs that function. Furthermore, the outer surface of the resin portion 56 filling the inside of the housing portion 58 lies on the same plane as the surface of the flow control plate 50, and thus, air from the rotating fans 5 flows smoothly over the surge absorber 51 and over the flow control plate 50, suppressing the generation of noise.

In an alternator of the above construction, the capacitor element 53 is embedded in a resin portion 56 composed of epoxy resin. The resin portion 56 takes about one day to solidify and is elastic after solidification. Thus, the capacitor element is protected and its quality ensured even in the harsh conditions of a vehicle, such as heat and vibration.

Furthermore, when the terminals 54 and 55 are being joined by soldering to the terminal 57, the terminals 54 and 55 are pressed into contact with the terminal 57 by their own elastic force trying to return outwards, firmly and reliably joining the terminals 54 and 55 to the terminal 57.

Because the capacitor element 53 is mounted inside the housing portion 58 lying flat, it is not easily affected by the vibrations of the engine, and the vibration resistance of the surge absorber is therefore improved.

Because the capacitor element 53 and the terminals 54 and 55 are isolated from the outside air by the resin portion 56 formed by a step of filling the housing portion 58 with resin, problems such as electrolytic corrosion of the positive terminal 54 due to wetting with salt water or the like, or breaking of the wires at the joints between the terminals 54 and 55 and the terminals 57 of the inserted conductor due to natural corrosion are eliminated.

Furthermore, capacitor elements may have different sizes depending on their capacitance, but because these can be accommodated by adjusting the amount of resin forming the resin portion 56 without changing the housing portion 58, a variety of surge absorbers 51 can be accommodated by a single type of base 200, enabling costs to be reduced by using a common part. Embodiment 2

Figure 4:
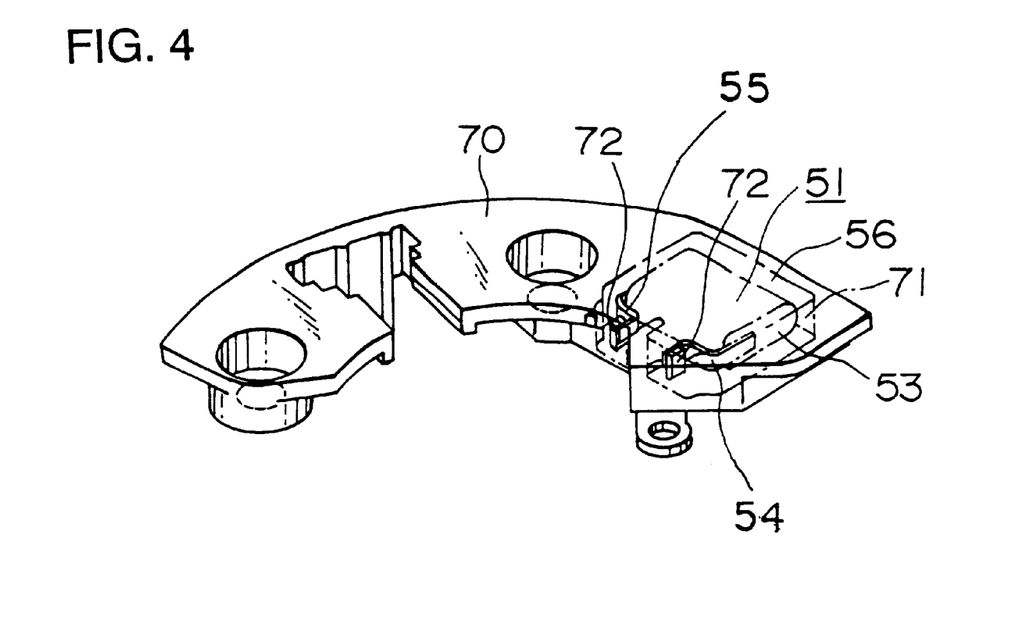
FIG. 4 is a perspective of part of an alternator according to Embodiment 2 of the present invention.
Figure 5:
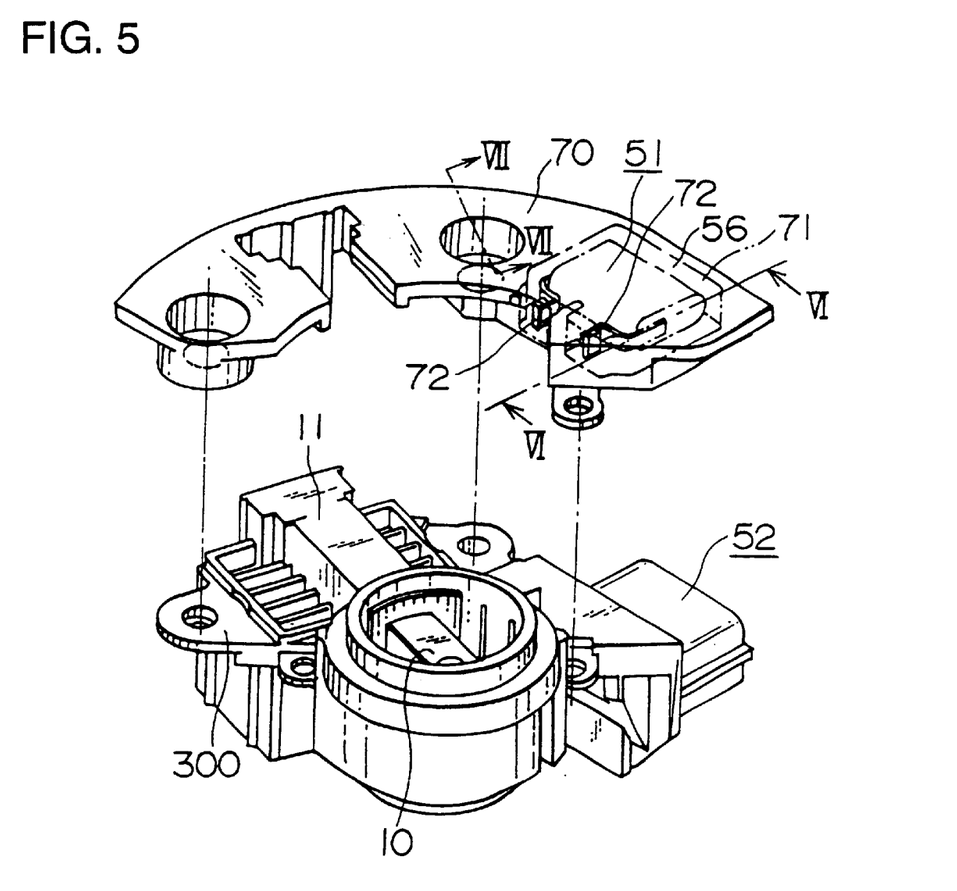
FIG. 5 is an exploded perspective of part of an alternator according to Embodiment 2 of the present invention.
Figure 6:
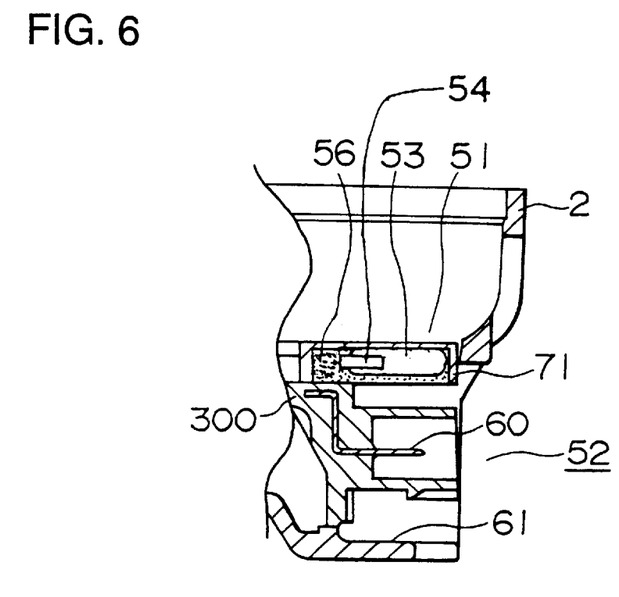
FIG. 6 is a partial cross section of an alternator according to Embodiment 2 of the present invention.
Figure 7:
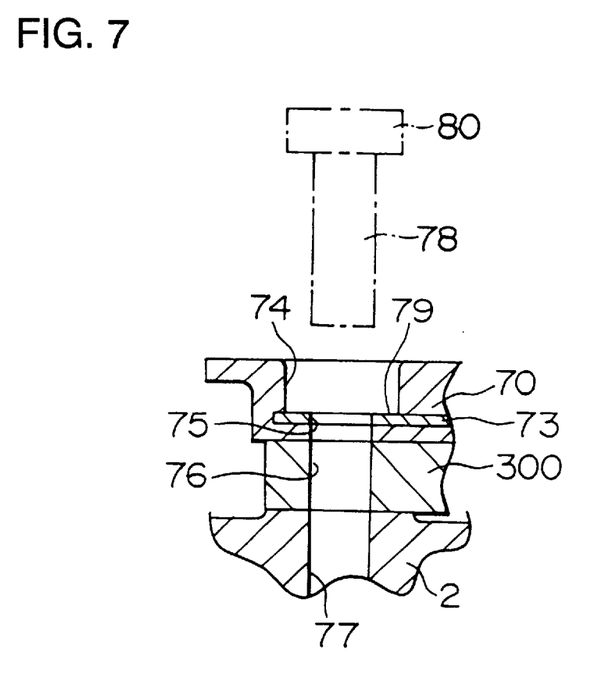
FIG. 7 is a cross section taken along line VII—VII in FIG. 5.

FIG. 4 is a perspective of a flow control plate 70 of an alternator according to Embodiment 2 of the present invention, FIG. 5 is an exploded perspective of part of the alternator, FIG. 6 is a cross section taken along line VI—VI in FIG. 5 when the parts in FIG. 5 are housed in the rear bracket 2, and FIG. 7 is a cross section taken along line VII—VII in FIG. 5.

In this embodiment, a housing portion 71 being open on the side nearest to the connector 52 is formed in the flow control plate 70, and a surge absorber 51 which is the same as in Embodiment 1 is disposed in this housing portion 71. In other words, the surge absorber 51 includes: a capacitor element 53 having a rectangular parallelepiped shape over all, a positive terminal 54 and a negative terminal 55 being exposed in a stepped shape from both ends thereof; and a resin portion 56 sealing the capacitor element 53 with epoxy resin. The terminals 54 and 55 of the capacitor element 53 are joined by soldering to terminals 72. These terminals 72 are externally exposed portions of inserted conductor 73 embedded in the flow control plate 70.

The construction of the connector 52 is the same as in Embodiment 1, but air is prevented by the housing portion 71 of the flow control plate 70 from being drawn through the opening portion 61 of the connector 52 into the interior of the case 3 by the rotation of the fans 5.

Furthermore, in this embodiment, mounting bores 74, 75, 76, and 77 are formed in the flow control plate 70, the inserted conductor 73, the base 300, and the rear bracket 2, respectively, and a mounting bolt 78 engages and integrates the flow control plate 70, the base 300, and the rear bracket 2. Here, because the head 80 of the mounting bolt 78 is electrically to an exposed portion 79 of the inserted conductor 73, the exposed portion 79, which is electrically connected to the positive terminal 55 of the capacitor element 53, is electrically connected to the grounded rear bracket 2 through the mounting bolt 78.

In Embodiment 1, the filling direction for the resin filling the housing portion 58 was different from the filling direction for the resin filling the housing portion 21 for the voltage regulator 13, and it was necessary to perform each of the resin filling operations separately. However, in Embodiment 2, because the resin is injected into the housing portion 71 which is formed in the flow control plate 70 which is a separate member from the base 300, the step of injecting resin into the housing portion 21 for the voltage regulator 13 and the step of injecting resin into the housing portion 71 for the surge absorber 51 can be performed simultaneously in parallel.

As explained above, an automotive alternator according to one aspect of the present invention comprises a surge absorber being provided with: a capacitor element whose positive terminal and negative terminal are electrically joined to the terminals of the inserted conductor; and a resin portion covering the whole of the capacitor element including the positive terminal and the negative terminal. Therefore, problems such as electrolytic corrosion of the positive terminal due to wetting with salt water or the like, or breaking of the wires at the joints between the terminals of the capacitor element and the terminals of the inserted conductor due to natural corrosion are eliminated.

According to one form of the automotive alternator, the housing portion of the base may be connected to the connector in the vicinity of the fan so as to block air from being drawn into the case through the connector by the rotation of the fan. Therefore, air drawn into the case by the rotation of the fans is directed smoothly to the voltage regulator, which must be cooled, without being hindered by air drawn in through the connector.

According to another form of the automotive alternator, a surface of the flow control plate opposite the fan and a surface of the surge absorber opposite the fan may lie on the same plane. Therefore, air from the rotating fans flows smoothly over the surge absorber and over the flow control plate, suppressing the generation of noise.

According to still another form of the automotive alternator, the positive terminal and the negative terminal of the capacitor element may extend in a step shape from both ends of the capacitor element and the tips of the positive terminal and the negative terminal may be elastically placed in contact with the terminals of the inserted conductor. Therefore, the soldering operation is improved, and the terminals of the capacitor element are reliably and firmly joined to the terminals of the inserted conductor.

An automotive alternator according to another aspect of the present invention comprises the surge absorber being provided with: a capacitor element whose positive terminal and negative terminal are electrically joined to the terminals of the second inserted conductor; and a resin portion covering the whole of the capacitor element including the positive terminal and the negative terminal. Therefore, because the capacitor element and the terminals thereof are isolated from the outside air by the resin portion, problems such as electrolytic corrosion of the positive terminal due to wetting with salt water or the like, or breaking of the wires at the joints between the terminals of the capacitor element and the terminals of the inserted conductor due to natural corrosion are eliminated. Furthermore, because the resin is injected into the housing portion which is formed in the flow control plate which is a separate member from the base, the step of injecting resin into the housing portion for the voltage regulator and the step of injecting resin into the housing portion for the surge absorber can be performed simultaneously in parallel.

According to one form of the automotive alternator, the housing portion of the flow control plate may be connected to the connector in the vicinity of the fan so as to block air from being drawn into the case through the connector by the rotation of said fan. Therefore, air drawn into the case by the rotation of the fans is directed smoothly to the voltage regulator, which must be cooled, without being hindered by air drawn in through the connector.

According to another form of the automotive alternator, the positive terminal and the negative terminal of the capacitor element may extend in a step shape from both ends of the capacitor element and the tips of the positive terminal and the negative terminal may be elastically placed in contact with the terminals of the second inserted conductor. Therefore, the soldering operation is improved, and the terminals of the capacitor element are reliably and firmly joined to the terminals of the inserted conductor.

According to still another form of the automotive alternator, the flow control plate, the second inserted conductor, the base, and the case may be integrated by a mounting bolt, the negative terminal of the capacitor element being grounded by being electrically connected to the case by means of the mounting bolt. Therefore, the negative terminal is reliably grounded, improving the quality of the surge absorber.

According to another form of the automotive alternator, the resin portion may be composed of epoxy resin. Therefore, a surge absorber of superior physical strength and heat resistance can be provided inexpensively.

What is claimed is:

1. An automotive alternator comprising:

a case;

a shaft rotatably disposed inside said case;

a rotor secured to said shaft;

a fan secured to an end surface of said rotor;

a stator secured to an inner wall of said case;

a base attached to said case through which said shaft passes having an inserted conductor embedded therein except for terminals;

a voltage regulator integrated with said base for adjusting a magnitude of an alternating voltage generated in said stator;

a flow control plate attached to said base disposed opposite said fan for directing to said voltage regulator air drawn into said case by the rotation of said fan;

a surge absorber enclosed in a housing portion formed in said base for absorbing surges generated as said voltage regulator regulates said voltage; and a connector integrated with said base electrically connected to said inserted conductor, said surge absorber being provided with:

a capacitor element whose positive terminal and negative terminal are electrically joined to said terminals of said inserted conductor; and a resin portion covering the whole of said capacitor element including said positive terminal and said negative terminal.

2. The automotive alternator according to claim 1 wherein said housing portion of said base is connected to said connector in the vicinity of said fan so as to block air from being drawn into said case through said connector by the rotation of said fan.

3. The automotive alternator according to claim 1 wherein a surface of said flow control plate opposite said fan and a surface of said surge absorber opposite said fan lie on the same plane.

4. The automotive alternator according to claim 1 wherein said positive terminal and said negative terminal of said capacitor element extend in a step shape from both ends of said capacitor element and the tips of said positive terminal and said negative terminal are elastically placed in contact with said terminals of said inserted conductor.

5. The automotive alternator according to claim 1 wherein said resin portion is composed of epoxy resin.

6. An automotive alternator comprising:

a case;

a shaft rotatably disposed inside said case;

a rotor secured to said shaft;

a fan secured to an end surface of said rotor;

a stator secured to an inner wall of said case;

a base through which said shaft passes attached to said case having a first inserted conductor embedded therein;

a voltage regulator integrated with said base for adjusting a magnitude of an alternating voltage generated in said stator;

a flow control plate disposed opposite said fan for directing to said voltage regulator air drawn into said case by the rotation of said fan, said flow control plate having a second inserted conductor embedded therein except for terminals;

a surge absorber enclosed in a housing portion formed in flow control plate for absorbing surges generated as said voltage regulator regulates said voltage; and a connector integrated with said base electrically connected to said first inserted conductor, said surge absorber being provided with:

a capacitor element whose positive terminal and negative terminal are electrically joined to said terminals of said second inserted conductor; and a resin portion covering the whole of said capacitor element including said positive terminal and said negative terminal.

7. The automotive alternator according to claim 6 wherein said housing portion of said flow control plate is connected to said connector in the vicinity of said fan so as to block air from being drawn into said case through said connector by the rotation of said fan.

8. The automotive alternator according to claim 6 wherein said positive terminal and said negative terminal of said capacitor element extend in a step shape from both ends of said capacitor element and the tips of said positive terminal and said negative terminal are elastically placed in contact with said terminals of said second inserted conductor.

9. The automotive alternator according to claim 6 wherein said flow control plate, said second inserted conductor, said base, and said case are integrated by a mounting bolt, said negative terminal of said capacitor element being grounded by being electrically connected to said case by means of said mounting bolt.

* * * * *